3,164,503
AQUEOUS EMULSIFIED AMMONIUM NITRATE BLASTING AGENTS CONTAINING NITRIC ACID
Neil E. Gehrig, Schuylkill Haven, Pa., assignor to Atlas Chemical Industries, Inc., Wilmington, Del., a corporation of Delaware
No Drawing. Filed May 13, 1963, Ser. No. 280,128
19 Claims. (Cl. 149—18)

The present invention relates to blasting agents containing nitric acid as an essential component thereof and particularly to blasting agents which are comprised of an aqueous solution of nitric acid, and an insensitive, immiscible fuel.

The compositions of the present invention have the advantage of performing as powerful explosives but do not contain a sensitive high explosive component. The present compositions are highly insensitive to mechanical shock but are sensitive to detonation when initiated by the booster or priming means commonly used to initiate ammonium nitrate blasting agents.

The compositions of the present invention are dispersions and comprise an aqueous solution of nitric acid and an insensitive, immiscible fuel. The fuel component is immiscible with the nitric acid solution and is substantially unreactive with the nitric acid component under normal conditions of mixing and storage. The compositions of the present invention are relatively stable dispersions, that is, there is little separation of the components into individual phases, for at least 8 hours and generally the compositions are stable for periods of several months. The compositions of the present invention contain nitric acid and, on the basis of 100 parts by weight of an aqueous solution of nitric acid containing between about 30% and about 80% by weight of nitric acid, generally contain from about 3 to about 500 parts by weight of an insensitive, carbonaceous fuel immiscible in the nitric acid solution. Some embodiments of the invention may also include ammonium or an alkali metal nitrate, for example, the granular mixture and solid dispersion forms of the present invention described anon.

The term "immiscible" as used herein is defined as an inability to form a stable, homogeneous mixture with an aqueous solution of nitric acid containing between about 30% and about 80% by weight of nitric acid.

The various suitable components, their proportions, and the physical forms of the present invention will be described in more detail in the following sections:

NITRIC ACID

The nitric acid component of the present mixtures preferably is an aqueous solution of nitric acid containing between about 30% and about 80% by weight of nitric acid. Aqueous solutions of about 60% by weight of nitric acid aptly suited to use in the present mixtures are readily available in the commercial market. Such solutions are less reactive and much less expensive than more highly concentrated nitric acid solutions. Although a more highly concentrated nitric acid solution can be used in the present invention, the hazards of handling are not compensated by a substantial increase in the effectiveness of the final mixture. However, if desired, concentrated nitric acid and an appropriate amount of water may be separately added and incorporated into the mixtures. Since the nitric acid and water may be separately added to the present mixtures, the concentration of the aqueous solution of nitric acid is defined as $$\frac{\text{Total weight } HNO_3 \text{ in the mixture}}{\text{Total weight of } HNO_3 \text{ in the mixture} + \text{Total weight of water in the mixture}} \times 100$$

Nitric acid having a concentration of less than about 30% frequently yields a product which is insensitive to normal detonation means. Nitric acid having a concentration of greater than about 40% is usually preferred and generally produces a final composition having a satisfactory detonation velocity and sensitivity.

INSENSITIVE CARBONACEOUS FUEL MATERIAL

The term "insensitive" as used herein is defined as insensitive to detonation by a No. 8 blasting cap. A No. 8 blasting cap has the explosive equivalent of 2.00 grams of mercury fulminate.

The compositions of the present invention include a fuel material which is immiscible with an aqueous solution of nitric acid. That is, the two components may be utilized to produce a dispersion. Generally hydrocarbons whether paraffinic, olefinic, naphthenic, aromatic, saturated or unsaturated are suitable as the insensitive, carbonaceous fuel component. Carbohydrate materials, for example, sugars in dry form, such as sucrose, or in solution, such as molasses, may be utilized as supplemental fuels. Examples of insensitive, immiscible, carbonaceous fuel materials suited to use in the present mixtures are diesel fuel oil, or similar petroleum products, paraffinic waxes, vegetable oils, and powdered carbon. Generally the fuel material selected for use in the present invention will depend upon the desired physical form of the final product, i.e., if a pourable liquid product is desired, a liquid or semi-liquid fuel would be utilized; if a solid product is desired, a predominantly solid fuel would be utilized. Liquid fuels which are particularly suited to use in the slurry mixtures of the present invention are refined mineral oils which are liquids at normal temperatures and have a flash point above 100° F. In the granular mixtures contemplated by the present invention, No. 2 fuel oil is eminently suited to use. The specifications for No. 2 fuel oil are well-known and are set forth in the U.S. Department of Commerce Commercial Standard CS 12–48. No. 2 fuel oil has a flash point above 100° F., a 90% distillation point of 675° F. and a maximum Saybolt Universal viscosity at 100° F. of 125 seconds. Petroleum cuts sometimes referred to as low or partially refined oils are also suitable fuel components. Generally the fuels of the present compositions are unreactive with nitric acid under normal conditions of mixing and storage, that is, little, if any, fumes of the oxides of nitrogen will noticeably be given off by the mixture. Paraffins or paraffinic-based waxes are eminently suited to use as an unctuous fuel component.

AMMONIUM AND METAL NITRATE

While commercially available "fertilizer grade" ammonium nitrate is suited to use in the mixture of the present invention sodium and potassium nitrates may also be used. Preferably, the nitrate component is in particulate form, that is, having a size that will pass a No. 8 U.S.S. screen. A nitrate component in particulate form, for example, in the form of prills, pellets or granules, is aptly suited to use in the present mixtures.

OTHER ADDITIVES

The compositions of the present invention may include other ingredients to modify the physical properties of the mixture. For example, a particulate ammonium nitrate suited to use as a starting material in the granular form of the present compositions may, if desired, initially be treated with a thin coating of protective material to minimize attrition and caking of the particles. For example, a thin coat of clay, diatomaceous earth, or organic agents, such as a mixture of sulfonates of mono- and/or dimethyl naphthalenes, are frequently used as additives to particulate ammonium nitrate. Generally the inorganic additives such as clay are present in an amount of from about 0.5 to about 5.0% by weight of the ammonium nitrate. The organic additives are frequently effective in amounts as low as 0.05% by weight of the ammonium nitrate.

The present mixtures may include small amounts of a suitable surfactant, generally between about 3 and about 50 parts by weight based on 100 parts of an aqueous solution of nitric acid containing between about 30% and about 80% by weight of nitric acid to aid in obtaining and maintaining a homogeneous mixture. Generally from about 3 to about 30 parts by weight based on 100 parts of the nitric acid solution of a surfactant is sufficient to emulsify the present mixtures, however, additional surfactant, up to about 50 parts may be added without noticeable harmful effects. The surplus surfactant may be beneficial in that it supplies an additional supplemental fuel to the mixture.

The present mixtures may also include small amounts of a stabilizing material, generally between about 1 and about 20 parts by weight based on 100 parts by weight of nitric acid solution, to prevent the water phase of the mixtures from separating from the fuel component. If either the surfactant or the stabilizer materials are insensitive, carbonaceous and immiscible in aqueous nitric acid solutions, they may aid in fulfilling the fuel requirement described in the above section relating to fuels.

The sensitivity and detonation velocity of the slurry and solidified dispersion forms of the present invention usually may be stabilized by the addition of an inert, non-explosive propagation sustaining material, for example, expanded particulate perlite, or hollow glass balls. Generally about 1 part by weight of the propagation sustaining material, based on 100 parts by weight of a 60% nitric acid solution, is required to obtain an advantage and usually more than about 70 parts fails to yield further improvement. Expanded perlite, a commercially available material, is the mineral perlite, a volcanic glass composed largely of aluminum silicate, which has been put through a heating process so that it is expanded into an extremely light cellular form.

The various forms of the present invention and preferred ranges of the components in each form are discussed below:

PHYSICAL FORMS OF MIXTURES

The compositions of the present invention may be compounded in various physical forms, for example, (1) a granular form, that is, where a dispersion of an aqueous solution of nitric acid and an immiscible fuel is utilized to coat discrete granules of ammonium nitrate; (2) a slurry form wherein a dispersion of an aqueous solution of nitric acid and an immiscible fuel are slurried together (in a preferred embodiment the slurry form also includes ammonium nitrate) and; (3) a solidified form wherein an aqueous solution of nitric acid, an immiscible fuel and ammonium nitrate are emulsified and solidified. The latter solid emulsion form is adapted to be further modified to produce mixtures which may be molded or cast and in a short period of time will harden to a solid mixture without further curing or treatment.

GRANULAR MIXTURES

The granular mixtures of the present invention utilize a particulate ammonium nitrate component. This component may be coated or uncoated. Preferably the ammonium nitrate is of a size that will substantially entirely pass a No. 6 mesh U.S.S. screen. Since the present granular mixtures utilize a high proportion of ammonium nitrate, the proportions of the granular mixtures will be defined as being based on 100 parts by weight of the ammonium nitrate component. Using this basis, the granular mixtures preferably contain from about 3 to about 13 parts by weight of an aqueous solution of nitric acid containing from about 30% to about 80% by weight of nitric acid and a total of from about 4 to about 13 parts by weight of insensitive, immiscible, fuel material.

The angular mixtures of the present invention may be easily compounded by starting with the proper proportions of ammonium nitrate, nitric acid and fuel material and vigorously mixing the components.

Table I shows the results of a series of comparative tests of the prior art ammonium-nitrate diesel fuel oil mixtures and the blasting mixtures of the present invention. In each test the ammonium nitrate was weighed and a weighed amount of additive or additives vigorously mixed therewith. In each test No. 2 diesel fuel oil was utilized as the insensitive, immiscible, carbonaceous fuel material. Mixes 2, 3, 5, 6, 8 and 9 are illustrative of the present invention. The nitric acid component utilized in these mixes was an aqueous solution of nitric acid containing 60% by weight of nitric acid. In compounding the illustrative mixes of the present invention, a slight cooling was noted when the components and the aqueous solution of nitric acid were mixed. When the nitric acid component was added the color of the mixture changed from an off-white to a light green to a canary yellow. The illustrative mixes were allowed to stand for two hours to cure. The density of the ammonium nitrate starting material was calculated to be in the range of between about 0.8 and 0.9. After curing the density of the mixtures of the present invention were calculated to be in the range of between about 1.1 and about 1.3. In each case mixes were packed in a portion of ceramic pipe 3" in inside diameter and 10" in length. The packed mixture was primed with a ½ pound charge of Composition B (40% trinitrotoluene and 60% cyclotrimethylenetrinitramine). The charge of Composition B was detonated by means of an electric blasting cap and the detonation velocity of the exposive mixtures was determined by the Dautriche method wherein the velocity of the mixture being tested is compared to the known velocity of a length of detonating cord. The ammonium nitrate pellets used in Mixes 1, 2 and 3 were of a size that would substantially entirely pass a No. 8 mesh U.S.S. screen and would substantially entirely be held on a No. 35 mesh U.S.S. screen. The pellets were coated with about 3% by weight of finely divided clay. The ammonium nitrate prills used in Mixes 4, 5 and 6 were of a size that would substantially entirely pass through a No. 8 U.S.S. screen and be held on a No. 35 U.S.S. screen. The prills, Mixes 4, 5 and 6, were treated with about 0.05% by weight of an organic parting agent consisting of a mixture of sulfonates of mono- and/or dimethyl naphthalenes. The ammonium nitrate granules used in Mixes 7, 8 and 9 were sized to substantially entirely pass through a No. 6 U.S.S. screen and be held on a No. 35 U.S.S. screen. The granular ammonium nitrate was coated with about 3% by weight of finely divided clay. All values in the following table are parts by weight.

Table I

PELLETS

| Mix No. | Ammonium Nitrate | #2 Diesel Fuel Oil | Nitric Acid | Velocity (feet/second) |
|---|---|---|---|---|
| 1 | 100 | 6.1 | | 6,000 |
| 2 | 100 | 6.2 | 3.2 | 7,489 |
| 3 | 100 | 4.2 | 7.0 | 8,606 |

PRILLS

| Mix No. | Ammonium Nitrate | #2 Diesel Fuel Oil | Nitric Acid | Velocity (feet/second) |
|---|---|---|---|---|
| 4 | 100 | 6.1 | | 8,305 |
| 5 | 100 | 6.2 | 3.2 | 9,318 |
| 6 | 100 | 4.2 | 7.0 | 9,000 |

GRANULES

| Mix No. | Ammonium Nitrate | #2 Diesel Fuel Oil | Nitric Acid | Velocity (feet/second) |
|---|---|---|---|---|
| 7 | 100 | 6.1 | | Failed |
| 8 | 100 | 6.2 | 3.2 | 5,577 |
| 9 | 100 | 6.2 | 3.2 | 5,577 |

Table II shows the results of comparative tests between typical prior art nitrocarbonitrate blasting agents and granular blasting agent mixtures of the present invention. Mixes 10 and 11 are typical prior art nitrocarbonitrate blasting agents. Mixes 12, 13 and 14 are illustrative of the mixtures of the present invention. The ammonium nitrate material in each of the mixes was sized so that 50% would pass through a No. 35 U.S.S. screen and substantially 100% would be held on a No. 100 U.S.S. screen. In each mix shown on Table II, the oil component was a partially refined oil, Atreco F oil, a product of Atlantic Refining Company. The nitric acid component used in Mixes 12, 13 and 14 was an aqueous solution containing 60% by weight of nitric acid. The various additives in each mix were separately added and incorporated into the ammonium nitrate material by vigorous stirring. The mixes were each packed into a portion of ceramic pipe and primed with a high velocity booster, for example, Mixes 10, 11, 13 and 14 were primed with a 750 gram charge of gelatin dynamite and Mix 12 was primed with a ½ pound charge of Composition B. The booster was fired by means of a blasting cap. The detonation velocity of the mixes was determined by the Dautriche method. In Mix 13, for example, 7.6 parts by weight of a low refined oil (Atreco F oil), 3.8 parts by weight of finely divided diatomaceous earth and 5.9 parts by weight of an aqueous solution of nitric acid (60% by weight nitric acid) were mixed with 100 parts by weight of particulate ammonium nitrate. The mixture was then placed in a 3″ x 10″ portion of ceramic pipe (3″ in diameter and 10″ in length) and primed with 750 grams charge of gelatin dynamite. The detonation velocity of the mix, as determined by the Dautriche method was 7636 feet per second. The other mixes shown on Table II were similarly compounded and tested except that Mixes 10 and 11 contained no nitric acid component.

Table III shows the results of a series of tests of the blasting agent mixtures of the present invention containing carbohydrate material as a supplementary fuel material. In each mix, the particulate ammonium nitrate component was coated with about 0.05% by weight of the organic parting agent used in Mixes 4, 5 and 6 of Table I and was of a size which would substantially entirely pass a No. 8 U.S.S. screen and substantially entirely be held on a No. 35 U.S.S. screen. The nitric acid component in each mix was an aqueous solution of nitric acid containing 60% by weight of nitric acid. For example, in Mix 15, 5.0 parts by weight of No. 2 diesel fuel oil, 3.3 parts by weight of granulated sugar, and 8.7 parts by weight of an aqueous solution of nitric acid (containing 60% by weight of nitric acid) were added and thoroughly mixed with 100 parts by weight of ammonium nitrate. The mixture was then packed into a 3″ x 10″ ceramic pipe and primed with a ½ pound charge of Composition B. The detonation velocity determined by the Dautriche method was 9992 feet per second. The other mixes shown on Table III were compounded and tested in a similar manner. The particulate carbon and glucose mixture of Mix 17 was a waste product of a sugar refinery and consisted of spent activated carbon saturated with glucose.

*Table III*

| Mix No. | Form of Ammonium Nitrate | Parts by weight | | | | | | Detonation Velocity (feet/second) |
| --- | --- | --- | --- | --- | --- | --- | --- | --- |
| | | Ammonium Nitrate | #2 Diesel Fuel Oil | Granulated Sugar | Molasses | Mixture of Particulate Carbon and Glucose | 60% Nitric Acid | |
| 15 | Prills | 100 | 5.0 | 3.3 | | | 8.7 | 9,992 |
| 16 | Pellets | 100 | 5.0 | | 7.5 | | 12.5 | 9,703 |
| 17 | do | 100 | 5.0 | | | 7.5 | 12.5 | 9,055 |

SLURRY MIXTURES

The present invention also provides blasting agents in the form of dispersions which may be compounded in slurry form. The blasting slurries contemplated by the present invention are pourable and liquid or semi-liquid in nature. Since the mixtures of the present invention in slurry form contain an aqueous solution of nitric acid and may be compounded without ammonium nitrate, the proportions of the slurry mixture are based on the nitric acid component. Based on 100 parts by weight of an aqueous solution of nitric acid containing between about 30 and about 80% by weight of nitric acid, the slurry mixtures include from about 3 to about 65 parts by weight of an insensitive, immiscible, carbonaceous fuel independent of the amounts of surfactant and stabilizer. The slurry mixtures of the present invention may, in addition to nitric acid and fuel, contain an ammonium, potassium or sodium nitrate component. In such case, based on 100 parts by weight of an aqueous solution of nitric acid containing between about 30 and about 80% nitric acid, up to about 550 parts by weight of the nitrate component may be included. An advantage of the slurry mixtures of the present invention which contain nitric acid and

*Table II*

| Mix No. | Ammonium Nitrate | Oil | Diatomaceous Earth | 60% Nitric Acid | Cartridge size | Primer | Detonation Velocity (ft./second) |
| --- | --- | --- | --- | --- | --- | --- | --- |
| 10 | 100 | 7.7 | 3.7 | | 3″ × 10″ | 750 grams gelatin dynamite | Failed |
| 11 | 100 | 7.7 | 3.7 | | 6″ × 10″ | do | Failed |
| 12 | 100 | 7.6 | 3.8 | 5.9 | 3″ × 10″ | ½ pound Comp. B | 7,636 |
| 13 | 100 | 7.6 | 3.8 | 5.9 | 3″ × 10″ | 750 grams gelatin dynamite | 7,681 |
| 14 | 100 | 7.6 | 3.8 | 5.9 | 4″ × 10″ | do | 7,717 | either ammonium or potassium nitrate is that under normal conditions such mixtures exhibit neither the amount of normally titratable acidity nor the amount of corrosiveness that would be expected from the amount of nitric acid included in the mixture. The fuel component is immiscible in water and preferably is an unctuous material such as paraffin or refined mineral oil. Of the unctuous materials which are suited to use, materials which are liquid at ambient temperature are particularly useful. A suitable fuel fulfilling the requirements of the present invention is a refined hydrocarbon oil from which substantially all unsaturated hydrocarbons have been removed. Mixtures which contain relatively small amounts of nitric acid, as compared to the amount of the nitrate component, for example, those containing at least about 300 parts by weight of the nitrate component as compared to 100 parts by weight of nitric acid solution, are generally found to be thick, almost paste-like mixtures while mixtures containing a greater amount of nitric acid tend to be fluid and generally are quite flowable mixtures. The thick, almost paste-like mixtures frequently are suitable starting materials for producing the solid mixtures of the present invention which are described below. Because the slurry mixtures are fluid the particulate nitrate starting material need not be coated with clay or other parting agent. The aqueous nitric acid solution of the present invention exhibits a preferred sensitivity when they contain at least about 40% by weight of nitric acid.

The slurry mixtures of the present invention are in the physical form of stable dispersions. The present dispersions evidence no separation of components when stored at temperatures in the range of 75° to 85° F. for periods of at least 8 hours. Frequently the present dispersions are stable for periods of 6 months or more.

An acid-resistant stabilizer in an amount between about 1 and about 10 parts based on the weight of the nitric acid solution component as 100, may be added to the slurry mixture to prevent separation of the components. Generally no stabilizer is required if the slurry is mixed and used in the same 24 hour period; however, where the slurry is to be stored a stabilizer is desirable. A high molecular weight copolymer of methyl vinyl ether-maleic anhydride is a useful stabilizer. The product sold under the trade name "Gantrez AN-169" by General Aniline & Film Co. is a copolymer of methyl vinyl ether-maleic anhydride having a mol weight of about 1,250,000 and is suited to use. A low density colloidal silica is a useful stabilizer. The product "Cabosil M-5" manufactured by the Cabot Corporation is suited. Synthetic polymers and copolymers, particularly those of acrylamide, have been found suited to use as stabilizers. A mixture of such polymers and copolymers, sold under the trade name "Cyanogum 41," a product of American Cyanamid Co., is a suitable stabilizer. Other useful stabilizers, for example, are polyacrylic acid, and other water soluble acrylic polymers.

The present slurry mixtures may contain between about 3 and about 50 parts, based on the weight of the nitric acid solution as 100, on an acid resistant surfactant capable of forming an emulsion of oil in water. Generally a minimum of about 3 parts is required to form a satisfactory oil emulsion between the unctuous fuel component and the aqueous solution of nitric acid. Any excess, to about 50% based on the weight of nitric acid, yields no noticeable ill effects and may be a supplemental source of insentive carbonaceous fuel. Sorbitan monopalmitate, sorbitan monooleate and sorbitan monostearate have been found to be acid resistant and suited to use in the emulsion slurries of the present invention.

The present slurry mixtures may contain an inert, non-explosive propagation sustaining material in an amount sufficient to stabilize the sensitivity and detonation velocity during storage of the slurries. Suitable propagation sustaining materials are, for example, perlite and hollow glass balls. Preferably the propagation sustaining materials are of a size that will pass a No. 8 mesh U.S.S. screen. Generally a minimum of about 1 part of the propagation sustaining material, based on 100 parts by weight of an aqueous solution of nitric acid containing between about 30 and about 80% by weight nitric acid, is required to give noticeable results. Usually an excess of over about 70 parts by weight of the propagation sustaining material on the foregoing basis of nitric acid yields no obvious additional advantages.

The mixtures of the present invention in slurry form may be compounded by mixing the proper proportions of an aqueous solution of nitric acid and insensitive, immiscible fuel material together. If an additional component such as a stabilizer or a surfactant is utilized, the additional component is preferably blended with and added along with the fuel material.

Blasting agent emulsions in slurry form are contemplated by the present invention. Preferably such emulsions are compounded by initially blending an acid-resistant surfactant with an insensitive immiscible fuel component. Preferably the fuel is a refined or partially refined oil, paraffin or paraffin-based wax. If sorbitan monooleate is used as the emulsifying component, it is desirable to mix the sorbitan monooleate with a small amount of water to facilitate solution of the sorbitan monooleate in the mixture. If a stabilizing component is to be utilized in addition to the surfactant, it may be added along with the fuel-surfactant blend. The fuel-additive blend is then thoroughly mixed with the ammonium nitrate component. The nitric acid component is added and slowly stirred into the mixture and the final product heated (to a temperature within the range of from about 80° F. to about 150° F.) to remove a portion of entrapped air. The latter heating step increases the density of the final mixture and produces a more stable emusion.

Table IV shows the results of a series of tests of slurry mixtures of the present invention. In Mix No. 18, 7.8 parts by weight of sorbitan monooleate and 7.8 parts by weight of water were initially blended to facilitate the latter solution of the sorbitan monooleate in the final slurry mixture, 20 parts by weight of a refined mineral oil marketed under the name "Nujol" by Plough, Inc., was mixed with the surfactant-water blend. This mixture was then added to and incorporated in 264 parts by weight of particulate ammonium nitrate. In order to speed solution the ammonium nitrate component was sized so that substantially 100% passed through a No. 35 U.S.S. screen. 100 parts by weight of an aqueous solution of nitric acid (containing 60% by weight of nitric acid) was slowly stirred into the mixture. The mixture was stirred until an emulsion formed, at which time the mixture noticeably thickened. The emulsified product was then heated by means of a steam bath to 110° F. While still fluid, the mixture was removed from the heat. A sample of the mixture was tested for emulsion stability by storing the sample at a temperature of from 75 to 85° F. and noting any evidence of component separation over a period of time. The mixture in Mix No. 18 was found to have a minimum stability time of 8 hours. While a "Minimum Stability Time" is given for each of the mixes, it will be understood that the present emulsions may be stable for much longer periods of time. The dispersions of the present invention have a minimum stability time of at least 8 hours. The mixture was tested by packing a portion of the mixture into a ceramic pipe 3″ in diameter and 10″ long, primed with a ¾ pound charge of Composition B. The detonation velocity determined by the Dautriche method was 8834 feet per second. The remaining mixes shown on Table IV were compounded and tested in the same manner. The surfactant in Mixes 20 through 23 was sorbitan monostearate and in Mixes 24 through 33 was sorbitan monopalmitate. In Mixes 22 and 23, a stabilizer of Cyanogum 41, a high molecular weight mixture of acrylamide and N,N'-methylene bisacrylamide monomers, was utilized. In Mixes 24 through 33, a stabilizer of "Gantrez AN-169," a high molecular weight copolymer of methyl vinyl ether-maleic anhydride. Mix 29 utilized a stabilizer of "Cabosil M-5," a high grade colloidal silica. The stabilizer was added to the fuel component prior to mixing the fuel and ammonium nitrate components. In Mix 29 paraffin was utilized as the fuel and colloidal silica as a stabilizer. In Mixes 34 through 36 an inert, non-explosive propagation sustaining material of particulate expanded perlite was added to stabilize the detonation velocity and detonation sensitivity during storage.

Table IV

| Mix No. | Parts by weight | | | | | | | | Propagation Sustaining Material | Density | Detonation Velocity (feet/second) | Minimum Stability Time |
|---|---|---|---|---|---|---|---|---|---|---|---|---|
| | Ammonium Nitrate | Insensitive Immiscible Fuel Material | Sorbitan Monooleate | Sorbitan Monostearate | Sorbitan Monopalmitate | Nitric Acid (Basis: 60% HNO$_3$ Aqueous Solution | Water | Emulsion Stabilizer | | | | |
| 18 | 264 | 20 | 7.8 | | | 100 | 7.8 | | | 1.5 | 8,834 | 8 hours. |
| 19 | 264 | 20 | 7.8 | | | 100 | 7.8 | | | 1.5 | 13,755 | Do. |
| 20[1] | 345 | 30 | | 25.2 | | 100 | | | | 1.5 | 16,000 | Do. |
| 21 | 128 | 12.6 | | 9.9 | | 100 | | | | 1.6 | 20,350 | Do. |
| 22 | 261 | 20 | | 16.0 | | 100 | | 2.1 | | 1.6 | 16,500 | 5 weeks. |
| 23[1] | 345 | 25.2 | | 25.2 | | 100 | | 5.2 | | 1.5 | 16,000 | Do. |
| 24 | 530 | 6.4 | | | 6.4 | 100 | | 6.4 | | 1.4 | 10,300 | 6 months. |
| 25 | 505 | 26.7 | | | 26.7 | 100 | | 6.6 | | 1.3 | 14,300 | Do. |
| 26 | 132 | 5.0 | | | 5.0 | 100 | | 7.5 | | 1.4 | 15,200 | Do. |
| 27 | 102 | 20.0 | | | 20.0 | 100 | | 7.5 | | 1.2 | 17,900 | Do. |
| 28 | 62.5 | 40.0 | | | 40.0 | 100 | | 7.5 | | 1.0 | 14,000 | Do. |
| 29 | 358 | 34.9 | | | | 100 | | 5.0 | | | 10,659 | Do. |
| 30 | 114 | 20.0 | | | 10.0 | 100 | | 6.3 | | 1.2 | 19,611 | Do. |
| 31 | 70 | 16.0 | | | 8.0 | 100 | | 6.0 | | 1.2 | 21,200 | Do. |
| 32 | 20 | 11.4 | | | 5.7 | 100 | | 5.7 | | 1.2 | 15,500 | Do. |
| 33 | 0 | 9.5 | | | 4.8 | 100 | | 4.8 | | 1.2 | 15,000 | Do. |
| 34 | 450 | 40.0 | | | 13.4 | 100 | | 3.3 | 53.2 | 1.2 | 14,000 | Do. |
| 35 | 167 | 23.4 | | | 10.0 | 100 | | 6.7 | 26.7 | 1.2 | 16,000 | Do. |
| 36 | 66 | 16.0 | | | 8.0 | 100 | | 6.0 | 5.0 | 1.2 | 18,000 | Do. |

[1] Mixes 20 and 23 were thick, paste-like mixtures.

SOLIDIFIED MIXTURES

The present invention also contemplates solid, nitrocarbonitrate mixtures which may be molded, cast or extruded into any desired shape. The solid mixtures of the present invention are related to the slurry emulsions described above, however, instead of remaining in slurry form the mixtures solidify. The solid mixtures of the present invention require that (1) the components be proportioned within rather specific ranges, (2) the final mixture be heated to form a melt and drive off excess entrapped air. The proportions of components which are suited to form solid mixtures overlap the range of components suited to provide a slurry form of the explosive. The slurry formulas in the overlap area are thick, almost paste-like mixtures and may be transformed into solid mixtures by extending the heating step. The solidified mixtures include ammonium potassium or sodium nitrate as a component. On the basis of 100 parts by weight of an aqueous solution of nitric acid containing from about 30% to about 80% by weight of nitric acid, the solidified mixtures contain at least 300 parts by weight of the nitrate component. Generally satisfactory solidified mixtures based on 100 parts by weight of the nitric acid solution component contain between about 300 and about 550 parts of the nitrate component, from about 20 to about 80 parts by weight of a fuel component, and at least 6 parts by weight of an acid resistant surfactant, such as sorbitan monostearate, sorbitan monopalmitate or sorbitan monooleate, as the emulsifying agent. Usually over 50 parts of surfactant, based on 100 parts of the nitric acid component, yields no obvious benefit. The solidified mixtures of the present invention may also include a stabilizer component. Suitable stabilizer components are described in the foregoing section describing Slurry Mixtures. If a stabilizer component is used, it usually produces no increase in effectiveness above about 20 parts by weight based on 100 parts of the nitric acid solution component. If any additives are utilized which meet the requirements for a fuel component, that is they are carbonaceous, immiscible and insensitive to detonation, their weight may be considered as additional fuel. Generally the mixtures of the present invention form a melt in a range between 100° F. and 135° F. and this temperature is sufficient to form the present solid mixtures. For safety purposes, it is preferred that the components be chosen so that the mixture has a melting point not substantially higher than about 150° F.

The present solid dispersions may contain an inert, non-explosive propagation sustaining material in an amount sufficient to stabilize the sensitivity to detonation and detonation velocity during storage of the dispersions. Suitable propagation sustaining materials are generally of a size which will pass a No. 8 mesh U.S.S. screen. Materials suitable for this purpose are, for example, perlite and hollow glass balls. Generally a minimum of about 1 part of the propagation sustaining material, based on 100 parts by weight of an aqueous solution of nitric acid containing between about 30 and about 80% by weight of nitric acid, is required to give noticeable results. Usually an excess of over about 70 parts by weight of the propagation sustaining material on the foregoing basis of nitric acid yields no obvious additional advantages.

Table V shows the composition of a series of solidified dispersions and the results of performance tests carried out utilizing the solid mixtures. For example, Mix 37 was compounded by initially blending 35.9 parts by weight of refined mineral oil and 26.8 parts by weight of sorbitan monostearate, mixing the blend with 505 parts by weight of particulate ammonium nitrate of a size that will substantially entirely pass a No. 35 U.S.S. screen, and adding 100 parts by weight of an aqueous solution of nitric acid containing 60% by weight of nitric acid. The resulting mixture was stirred until the mixture stiffened and then heated from about 100 to about 105° F. to rid the mixture of excess air bubbles introduced in the mixing operation. In Mix 39, 46.5 parts by weight of a paraffinic-based wax (90% paraffin and 10% ethyl vinyl acetate) was utilized as the fuel component. The heated mixture was poured into a portion of ceramic pipe 3″ in diameter and 10″ in length. The mixture solidified in about two hours. The solid mixture was then primed with a ¾-pound charge of Composition B and the Composition B initiated by a blasting cap. The detonation velocity determined by the Dautriche method was determined to be 12,200 feet per second. A sample of the mixture was stored at temperatures ranging between 75 and 85° F. and after a period of 6 months was found to evidence no component separation. The other mixes shown in Table V below were carried out in the same manner. Mixes 41 and 42 are examples of solidified mixtures which contain perlite as an inert, non-explosive propagation sustaining material to stabilize the detonation velocity and detonation sensitivity during storage.

In general, the density of the mixtures is determined by the amount of air entrapped in the mixture. A product having a density of well over 1 may be produced by removing a substantial amount of the entrapped air. Entrapped air may be removed by placing the mixture immediately after stirring, and before it has solidified, in an open vessel and heating. In order to insure that the solid mixture will have a satisfactory sensitivity to detonation, it is desirable that a small amount of air remain in the mixture. A product having a density of from about 1.0 to about 1.4 and having a satisfactory sensitivity to detonation may be produced by heating the mixture after stirring to a temperature sufficiently high to form a melt. Generally such temperature is in the neighborhood of about 100° F. It is desirable for safety purposes, that the components be chosen so that the melting step can be carried out at a temperature not significantly in excess of 150° F.

Table V

| Mix No. | Parts by weight | | | | | | Density | Detonation Velocity |
| --- | --- | --- | --- | --- | --- | --- | --- | --- |
| | Ammonium Nitrate | Insensitive, Carbonaceous Immiscible Fuel | Sorbitan Mono-stearate | Gantrez AN-169 Stabilizer | Perlite | Nitric Acid | | |
| 37 | 505 | 35.9 | 26.8 | | | 100 | 1.4 | 12,200 |
| 38 | 354 | 25.1 | 19.9 | | | 100 | 1.5 | 13,500 |
| 39 | 500 | 46.5 | 20.0 | | | 100 | 1.3 | 13,500 |
| 40 | 503 | 46.5 | 13.0 | 3 | | 100 | 1.2 | 14,500 |
| 41 | 486 | 46.5 | 13.3 | 6.7 | 13.3 | 100 | 1.2 | 15,000 |
| 42 | 446 | 46.5 | 13.3 | 6.7 | 53.2 | 100 | 1.2 | 15,000 |

The term "consisting essentially of" as used in the claims, includes compositions containing the named components and other ingredients which do not deleteriously affect the compositions for the purposes stated in the specification.

What is claimed is:

1. A granular blasting composition consisting essentially of
   100 parts by weight of ammonium nitrate,
   from about 3 to about 13 parts by weight of an aqueous solution of nitric acid containing from about 30% to about 80% by weight of nitric acid, and
   from about 4 to about 13 parts by weight of an insensitive carbonaceous fuel material.

2. The composition of claim 1 wherein
   the insensitive carbonaceous fuel material is fuel oil.

3. The composition of claim 1 wherein
   the particulate ammonium nitrate ranges from a size which will substantially entirely pass a No. 6 U.S.S. screen.

4. A blasting slurry composition consisting essentially of
   a stable dispersion of ammonium nitrate,
   an aqueous solution of nitric acid, and
   an insensitive, carbonaceous fuel immiscible in the said nitric acid solution,
   said dispersion being stable for at least 8 hours.

5. The slurry composition of claim 4 wherein
   the aqueous solution of nitric acid contains from about 30% to about 80% by weight of nitric acid.

6. The slurry composition of claim 4 wherein
   the insensitive, carbonaceous fuel is selected from the group consisting of mineral oil, paraffin and paraffin-based waxes.

7. A blasting slurry composition consisting essentially of a dispersion of
   100 parts by weight of an aqueous solution of nitric acid containing from about 30% to about 80% by weight of nitric acid,
   up to 550 parts of ammonium nitrate, and
   from about 3 to about 65 parts by weight of mineral oil.

8. An emulsified blasting agent consisting essentially of
   ammonium nitrate,
   an aqueous solution of nitric acid,
   mineral oil, and
   an acid-resistant surfactant capable of forming an emulsion of water-in-oil.

9. The composition of claim 8 wherein
   surfactant is selected from the group consisting of sorbitan monooleate, sorbitan monopalmitate, and sorbitan monostearate.

10. The composition of claim 8 wherein
    the aqueous solution of nitric acid contains from about 30% to about 80% by weight of nitric acid.

11. An emulsified blasting agent consisting essentially of
    100 parts by weight of an aqueous solution of nitric acid containing from about 30% to about 80% by weight of nitric acid,
    from about 1 to about 550 parts by weight of ammonium nitrate,
    from about 3 to about 65 parts by weight of mineral oil, and
    from about 3 to about 50 parts by weight of an acid resistant surface active agent capable of forming an emulsion of water in oil.

12. The composition of claim 11 wherein
    surfactant is selected from the group consisting of sorbitan monooleate, sorbitan monopalmitate, and sorbitan monostearate.

13. An emulsified explosive composition consisting essentially of
    ammonium nitrate,
    an aqueous solution of nitric acid,
    mineral oil,
    an acid-resistant surface active agent capable of forming an emulsion of water in oil, and
    an acid-resistant stabilizer capable of retarding separation of the components of the composition.

14. The composition of claim 13 wherein
    surfactant is selected from the group consisting of sorbitan monooleate, sorbitan monopalmitate, and sorbitan monostearate.

15. The composition of claim 13 wherein
    the acid-resistant stabilizer selected from the group consisting of colloidal silica, polymers and copolymers of acrylamide, a copolymer of methyl vinyl ether-maleic anhydride, polyacrylic acid, and water-soluble acrylic polymers.

16. A method of preparing a blasting composition which comprises the steps of
    measuring between about 1 and about 550 parts by weight ammonium nitrate,
    forming a blend of between about 3 to about 50 parts by weight of mineral oil with between about 1 and about 10 parts by weight of an acid resistant surface active agent capable of forming an emulsion of water in oil,
    mixing said blend with said ammonium nitrate,
    adding about 100 parts by weight of nitric acid containing from about 30% to about 80% by weight of nitric acid to said blend and ammonium nitrate, agitating said mixture until said mixture forms an emulsion.

17. The method of claim 16 wherein
the ammonium nitrate component is sized to substantially entirely pass a No. 6 U.S.S. screen.

18. The method of claim 16 wherein
the final emulsion product is heated to remove sufficient air to produce a product having a density greater than 1.0.

19. The method of claim 18 wherein
the ammonium nitrate is present in an amount of between about 300 and about 550 parts by weight, and
the final emulsion product is heated at a temperature below about 150° F. to form a solid.

References Cited in the file of this patent

UNITED STATES PATENTS

| | | |
|---|---|---|
| 2,325,065 | Lawrence | July 27, 1943 |
| 2,333,637 | Carey | Nov. 9, 1943 |
| 2,345,582 | Carey | Apr. 4, 1944 |
| 2,672,411 | Taylor et al. | Mar. 16, 1954 |
| 2,865,727 | Dapper | Dec. 23, 1958 |
| 3,017,748 | Burnside | Jan. 23, 1962 |
| 3,058,301 | Larsen | Oct. 16, 1962 |
| 3,068,641 | Fox | Dec. 18, 1962 |
| 3,070,471 | Roy | Dec. 25, 1962 |
| 3,094,443 | Hradel | June 18, 1963 |

UNITED STATES PATENT OFFICE
CERTIFICATE OF CORRECTION

Patent No. 3,164,503　　　　　　　　　　　　　January 5, 1965

Neil E. Gehrig

It is hereby certified that error appears in the above numbered patent requiring correction and that the said Letters Patent should read as corrected below.

Column 4, line 29, before "mixes" insert -- the --; column 7, line 47, for "on" read -- of --; columns 9 and 10, Table IV, under the heading "Propagation Sustaining Material" and opposite "Mix No. 36", for "5.0" read -- 4.0 --.

Signed and sealed this 18th day of May 1965.

(SEAL)
Attest:

ERNEST W. SWIDER　　　　　　　　　　　　EDWARD J. BRENNER
Attesting Officer　　　　　　　　　　　　Commissioner of Patents